(12) United States Patent
Su et al.

(10) Patent No.: US 8,865,826 B2
(45) Date of Patent: Oct. 21, 2014

(54) ORGANIC/INORGANIC COMPOSITE FILM AND METHOD FOR FORMING THE SAME

(75) Inventors: Chun-Wei Su, New Taipei (TW); Chyi-Ming Leu, Hsinchu County (TW); Chih-Jen Yang, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 304 days.

(21) Appl. No.: 13/230,701

(22) Filed: Sep. 12, 2011

(65) Prior Publication Data

US 2012/0164423 A1    Jun. 28, 2012

(30) Foreign Application Priority Data

Dec. 22, 2010   (TW) ................................ 99145156 A

(51) Int. Cl.
*C08K 3/34*    (2006.01)
(52) U.S. Cl.
USPC ............................ 524/545; 524/445; 524/449
(58) Field of Classification Search
USPC ........................................ 524/545, 445, 449
See application file for complete search history.

(56) References Cited

U.S. PATENT DOCUMENTS

| | | | |
|---|---|---|---|
| 4,405,402 A | 9/1983 | Quilliam | |
| 4,419,209 A | 12/1983 | Klinkowski | |
| 4,513,032 A | 4/1985 | Klinkowski | |
| 4,549,947 A | 10/1985 | Inoue et al. | |
| 4,615,943 A | 10/1986 | Sakagami et al. | |
| 4,699,865 A | 10/1987 | Mitsuhashi | |
| 5,118,787 A | 6/1992 | Furuno | |
| 5,575,940 A * | 11/1996 | Lofftus | 252/62.63 |
| 5,618,647 A | 4/1997 | Kukimoto et al. | |
| 5,710,965 A | 1/1998 | Nozawa et al. | |
| 5,795,485 A | 8/1998 | Nakamura et al. | |
| 6,914,040 B2 | 7/2005 | Deak et al. | |
| 8,652,430 B2 * | 2/2014 | Yang et al. | 423/265 |
| 2003/0046775 A1 | 3/2003 | Deak et al. | |
| 2003/0096115 A1 | 5/2003 | Kozaki et al. | |
| 2004/0099356 A1 | 5/2004 | Wu | |

(Continued)

FOREIGN PATENT DOCUMENTS

| | | |
|---|---|---|
| CA | 2691570 | 12/2008 |
| CN | 1534378 A | 10/2004 |

(Continued)

OTHER PUBLICATIONS

Sadeghi, et al. "Study of Crystal Structure of (Polyvinylidene Flouride/Clay) Nanocomposite Films: Effect of Process Conditions and Clay Type", Society of Plastics Engineers; Polymer Engineering and Science, (2009), pp. 200-207, vol. 49.*

(Continued)

*Primary Examiner* — Peter D. Mulcahy
*Assistant Examiner* — Henry Hu
(74) *Attorney, Agent, or Firm* — Muncy, Geissler, Olds & Lowe, P.C.

(57) ABSTRACT

The present invention provides an organic/inorganic composite film, which includes a poly(vinylidene fluoride) (PVDF) and inorganic nano-platelets dispersed therein. A weight ratio of the PVDF and the inorganic nano-platelets is between about 97:3 and 20:80. The inorganic nano-platelets have a particle size of about 20-80 nm, wherein the organic/inorganic composite film has a transparency of greater than about 85% at a wavelength between 380 and 780 nm. In addition, a method for forming the organic/inorganic composite film is also provided.

5 Claims, 4 Drawing Sheets

(56) References Cited

U.S. PATENT DOCUMENTS

| | | |
|---|---|---|
| 2004/0185361 A1 | 9/2004 | Yoshino et al. |
| 2004/0261912 A1 | 12/2004 | Wu |
| 2005/0029194 A1 | 2/2005 | Hall et al. |
| 2005/0183635 A1 | 8/2005 | He et al. |
| 2005/0227082 A1 | 10/2005 | Shimazu et al. |
| 2006/0046027 A1 | 3/2006 | Kaminski et al. |
| 2006/0046028 A1 | 3/2006 | Kaminski et al. |
| 2006/0249705 A1 | 11/2006 | Wang et al. |
| 2007/0022798 A1 | 2/2007 | Morinaga et al. |
| 2007/0034117 A1 | 2/2007 | He et al. |
| 2007/0046865 A1 | 3/2007 | Umeda et al. |
| 2007/0059627 A1 | 3/2007 | Fukui et al. |
| 2007/0092777 A1 | 4/2007 | Zhamu et al. |
| 2007/0161821 A1 | 7/2007 | Hall et al. |
| 2007/0172640 A1* | 7/2007 | Tahara et al. ............. 428/319.1 |
| 2007/0275291 A1 | 11/2007 | Gu et al. |
| 2008/0017565 A1 | 1/2008 | Yanou et al. |
| 2008/0138704 A1 | 6/2008 | Mizuta et al. |
| 2009/0072433 A1 | 3/2009 | Wada et al. |
| 2009/0140219 A1 | 6/2009 | Zahn |
| 2009/0164147 A1 | 6/2009 | Kithil et al. |
| 2009/0238811 A1 | 9/2009 | McDaniel et al. |
| 2010/0000601 A1 | 1/2010 | Burchill |
| 2010/0081732 A1 | 4/2010 | Lin et al. |
| 2010/0104941 A1 | 4/2010 | Nakabayashi |
| 2010/0121023 A1 | 5/2010 | Fukui et al. |
| 2010/0164330 A1 | 7/2010 | Komatsu et al. |
| 2012/0164050 A1* | 6/2012 | Yang et al. ..................... 423/265 |
| 2012/0196191 A1* | 8/2012 | Jeon et al. ..................... 429/332 |

FOREIGN PATENT DOCUMENTS

| | | |
|---|---|---|
| CN | 1914264 A | 2/2007 |
| CN | 1951685 | 4/2007 |
| CN | 101045795 | 10/2007 |
| CN | 101053784 A | 10/2007 |
| JP | 62138533 | 6/1987 |
| JP | 11-021469 | 1/1999 |
| TW | 570942 | 1/2004 |
| TW | 586248 | 5/2004 |
| TW | 200801117 | 1/2008 |
| TW | 201000202 | 1/2010 |
| WO | WO-2009/000566 A1 | 12/2008 |
| WO | WO-2009/108469 A1 | 9/2009 |

OTHER PUBLICATIONS

Patro et al., "Studies on Poly(Vinylidene Flouride)-Clay Nanocomposites: Effect of Different Clay Modifiers", Elsevier; Polymer, (2008), pp. 3486-3499, vol. 49.*

Elashmawi et al., "Effect of PMMA Addition on Characterization and Morphology of PVDF", Polymer Engineering and Science, (2008), pp. 895-901.

Patro et al., "Studies on Poly(Vinylidene Flouride)-Clay Nanocomposites: Effect of Different Clay Modifiers", Elsevier Polymer, (2008), pp. 3486-3499, 49.

Sadeghi, et al. "Study of Crystal Structure of (Polyvinylidene Flouride/Clay) Nanocomposite Films: Effect of Process Conditions and Clay Type", Society of Plastics Engineers, (2009), pp. 200-207, 49.

Chinese Office Action for Chinese Application No. 201010616447.3 dated Oct. 14, 2013.

Notice of Allowance and Fees Due issued on Oct. 4, 2013 in corresponding U.S. Appl. No. 13/230,671.

Official Action issued on May 28, 2013, in corresponding TW Patent Application No. 99145159.

Official Action issued on Nov. 9, 2012, in corresponding U.S. Appl. No. 13/230,671.

* cited by examiner

ORGANIC/INORGANIC COMPOSITE FILM AND METHOD FOR FORMING THE SAME

CROSS REFERENCE TO RELATED APPLICATIONS

This application claims priority of Taiwan Patent Application No. 099145156, filed on Dec. 22, 2010, the entirety of which is incorporated by reference herein. The subject matter of this application relates to that of copending application filed Sep. 12, 2011 for "ORGANIC DISPERSION OF INORGANIC NANO-PLATELETS AND METHOD FOR FORMING THE SAME" by Yang, Leu and Su. The disclosure of the copending application is incorporated herein by reference in their entirety.

BACKGROUND OF THE INVENTION

1. Field of the Invention

The present invention relates to an organic/inorganic composite film, and in particular relates to an organic/inorganic composite film with high transparency.

2. Description of the Related Art

An organic/inorganic composite material is a new type of material which has both the advantages of organic and inorganic materials. Typically, inorganic materials such as glass, fibers, clay, or carbon black are added to a polymer as a supporting or strengthening agent, such that the physical properties of the polymer are enhanced. However, in addition to the strengthening performance, the original properties of the polymer are influenced by the dispersity and the particle size of the inorganic materials.

In various fluoride resins, poly(vinylidene fluoride) (PVDF) has the best mechanical strength and provides good strength in high temperature and pressure environments. Moreover, PVDF has good tenacity, hardness, abrasive resistance, anti-UV properties and weather aging resistance as well as good chemical and thermal stability. Meanwhile, PVDF is easy to be processed and has excellent applicability. Typically, a composite material formed by adding clay into the PVDF polymer may have advantages such as: 1. good piezoelectric characteristics; 2. good mechanical properties; 3. a low expansion coefficient; 4. high thermal resistance; 5. hydrophobic properties; 6. good permeability; and 7. good aging resistance. PVDF has three main crystalline phases, namely $\alpha$, $\beta$ and $\gamma$. The $\alpha$ crystalline phase is most seen, and the $\gamma$ crystalline phase is a mixture of the $\alpha$ crystalline phase and the $\beta$ crystalline phase. Among them, the $\beta$ crystalline phase has the best piezoelectric characteristics and mechanical properties. In general situations, the $\beta$ crystalline phase cannot be directly obtained from the melt of the PVDF, and only can be solidly transformed from the $\alpha$ crystalline phase.

Typically, a PVDF/clay composite material is formed by melting and mixing the PVDF and clay. The addition of the clay will result in a phase transformation of the PVDF. For example, the $\alpha$ crystalline phase of the PVDF will be transformed to the $\beta$ crystalline phase, such that the piezoelectric characteristics and mechanical properties of the PVDF are enhanced. However, the PVDF/clay composite film formed by the above method may have poor optical properties and the clay content is only 5-10 wt %.

Furthermore, in another conventional method, the PVDF composite material is formed by mixing polymethylmethacrylate (PMMA) and PVDF. The optical properties of the PMMA/PVDF composite film can be improved by this method, because the PMMA is transparent. However, the PMMA/PVDF composite film does not have the physical properties of organic/inorganic composite films since there is no incorporation of inorganic materials. Furthermore, the transparency of the PMMA/PVDF composite film depends on the content of the PMMA. The lower the PMMA content is, the lower the transparency of the PMMA/PVDF composite film may be obtained.

Thus, a novel PVDF/clay composite material with excellent optical properties is needed to be developed.

BRIEF SUMMARY OF THE INVENTION

An embodiment of the present invention provides an organic/inorganic composite film, including poly(vinylidene fluoride) (PVDF) with inorganic nano-platelets dispersed therein, wherein a weight ratio of the PVDF and the inorganic nano-platelets is between about 97:3 and 20:80, and wherein the inorganic nano-platelets has a particle size of between about 20 and 80 nm, and wherein the organic/inorganic composite film has a transparency greater than 85% at a wavelength between 380 and 780 nm.

An embodiment of the present invention provides a method for forming an organic/inorganic composite film, including: providing an organic dispersion of inorganic nano-platelets, wherein the organic dispersion comprises a first organic solvent and H-form type inorganic nano-platelets; mixing the organic dispersion with poly(vinylidene fluoride) (PVDF) to form a mixture; and coating and drying the mixture to form the organic/inorganic composite film, wherein a weight ratio of the PVDF and the inorganic nano-platelets is between about 97:3 and 20:80, and wherein the organic/inorganic composite film has a transparency of greater than 85% at a wavelength between 380 and 780 nm.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
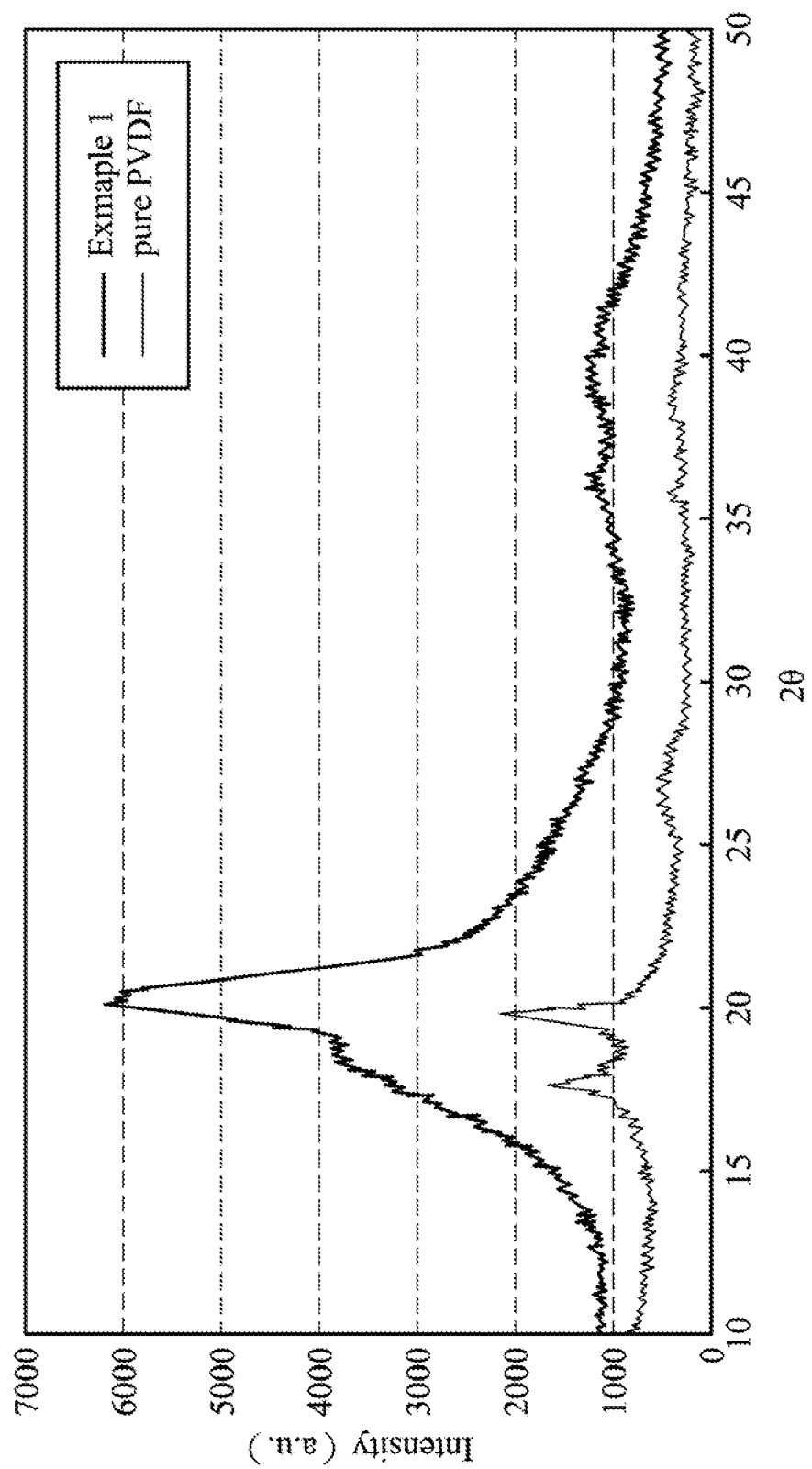
FIG. 1 shows XRD spectrums of the PVDF/clay composite film in Example 1 and a pure PVDF film.

The following description is of the best-contemplated mode of carrying out the invention. This description is made for the purpose of illustrating the general principles of the invention and should not be taken in a limiting sense. These are, of course, merely examples and are not intended to be limiting. The scope of the invention is best determined by reference to the appended claims.

The present invention provides an organic/inorganic film comprising PVDF and inorganic nano-platelets. The inorganic nano-platelets may have a small particle size and be dispersed in the PVDF uniformly such that the organic/inorganic composite film may have excellent optical properties. For example, the composite film may have high brightness, high transparency, low color cast, and low haze value. Furthermore, the PVDF may substantially maintain its β crystalline phase, while incorporating a high content of inorganic nano-plates therein.

According to the embodiments of the organic/inorganic composite film, the inorganic nano-platelets are formed of a mixture of an organic dispersion of inorganic nano-platelets and PVDF. The metal ions of the inorganic nano-platelets are directly exchanged with hydrogen ions by an ion-exchange procedure and no dispersing agents or modifying agents are added. Thus, the inorganic nano-platelets may maintain their shape and size after transference to the organic solvent. The resulting organic dispersion of inorganic nano-platelets may have a high solid content.

The method of forming the organic dispersion of inorganic nano-platelets may be related to that of copending application filed Sep. 12, 2011 for "ORGANIC DISPERSION OF INORGANIC NANO-PLATELETS AND METHOD FOR FORMING THE SAME" by Yang, Leu and Su, which is incorporated herein by reference in its entirety. An aqueous dispersion of inorganic nano-platelets is provided first. The inorganic nano-platelets may be natural or synthetic nano-clay. The nano-clay may have a particle size of between about 5 and 500 nm, and preferably of between about 20 and 300 nm. In one embodiment, the inorganic nano-platelets may have an aspect ratio of not less than 10, and preferably of between about 50 and 10000. The inorganic nano-platelets may include smectite clay, vermiculite, halloysite, sericite, mica, synthetic mica, layered double hydroxide, synthetic smectite clay or combinations thereof. The smectite clay may include montmorillonite, saponite, beidellite, nontronite, hecorite, stevensite or combinations thereof. In one embodiment, the aqueous dispersion may have a solid content of between about 1% and 20%.

Next, an H-form cation ion-exchange resin and an OH-form anion ion-exchange resin are added to the aqueous dispersion to perform an ion-exchange procedure. In this ion-exchange procedure, the metal cations of the inorganic nano-platelets may be replaced with hydrogen ions. In one embodiment, a mole ratio of the H-form cation ion-exchange resin and the OH-form anion ion-exchange resin is about 1:1. As such, the amount of hydrogen ions released from the reaction of the anion ion-exchange resin and the amount of hydroxide ions released from the reaction of the cation ion-exchange resin can be maintained to be substantially equal. In one embodiment, the H-form ion-exchange resin may be DOWEX® H-form resins, and the OH-form anion ion-exchange resin may be DOWEX® OH-form resins.

After the ion-exchange procedure, all of the inorganic nano-platelets are transformed to the H-form inorganic nano-platelets. Accordingly, the layered structure of the inorganic nano-platelets may be opened, such that the H-form inorganic nano-platelets are uniformly dispersed in the water by means of a smaller particle size.

Next, the aqueous dispersion of the H-form inorganic nano-platelets is thoroughly mixed with a mixture of a first organic solvent and a second organic solvent such that the H-form inorganic nano-platelets are transferred to the phase of the first and the second organic solvent from aqueous phase. The first organic solvent may include any organic solvents soluble with the second organic solvent and water. For example, the first organic solvent may include any alcohol soluble with water, ethyl ether, acetone or combinations thereof. In a preferred embodiment, the first organic solvent may be isopropanol. In one embodiment, the second organic solvent may include N-methyl-2-pyrrolidone (NMP), N,N-dimethyl acetamide (DMAc), γ-butyrolactone (GBL), N,N-dimethylformamide (DMF), dimethyl sulfoxide (DMSO), xylene, toluene or combinations thereof. Note that the boiling points of the water and the first organic solvent may be preferably lower than that of the second organic solvent such that the water and first organic solvent can be removed simultaneously in sequential processes. The amount of the second organic solvent may contribute to the solid content of the resulting organic dispersion; however, one skilled in the art should understand that the ratio of the first organic solvent and the second organic solvent can be variously changed according to the types of the first organic solvent and the second organic solvent.

Next, the water and the first organic solvent are removed by vacuum decompression concentration such that the H-form inorganic nano-platelets are able to be completely dispersed in the second organic solvent and form an organic dispersion of the H-form inorganic nano-platelets. In the present embodiment, the organic dispersion of the H-form inorganic platelets may have a solid content of between about 1 and 20 wt %, a plate shape, a particle size of between about 20 and 80 nm and an aspect ratio of not less than 10.

Next, the organic dispersion of inorganic nano-platelets are thoroughly mixed with the PVDF, wherein the PVDF may be dissolved in a third organic solvent such as N-methy-2-pyrrolidone (NMP), N,N-dimethyl acetamide (DMAc), γ-butyrolactone (GBL), N,N-dimethylformamide (DMF), dimethyl sulfoxide (DMSO), xylene, toluene or combinations thereof. In one embodiment, the third solvent for dissolving the PVDF is the same as that of the organic solvent of the organic dispersion. A weight ratio of the PVDF and the inorganic nano-platelets is between about 97:3 and 20:80, and preferably between about 90:10 and 30:70, and more preferably between about 80:20 and 40:60.

Next, bubbles of the mixed solution are removed by standing and a wet film is formed by a spin coating, blade coating, or screen coating process. Then, the wet film is dried at 50-70° C. for 5 to 15 mins and at 120-180° C. for 10 to 60 mins and the organic/inorganic composite film is formed. Note that although the organic/inorganic composite film has a high content of inorganic nano-platelets, the PVDF may still have a small crystalline size, for example, smaller than 100 nm. Thus, the organic/inorganic composite film may have excellent optical properties. Furthermore, since no other polymers (e.g., PMMA) are added thereto and a high content of the inorganic nano-platelets are incorporated therein, the PVDF film may have a substantially pure β crystalline phase (i.e, not including the α crystalline phase) which is transformed from the α crystalline phase. In one embodiment, the organic/inorganic composite film may have a thickness of between about 1 and 100 μm.

In summary, the inorganic nano-platelets may have uniform dispersity in the PVDF film since the nano-platelets may have a small particle size and are uniformly dispersed in an organic solvent for mixing with the PVDF. Furthermore, the PVDF in the composite film may have a crystal size of smaller than 100 nm. Thus, the organic/inorganic composite film obtained according to the embodiments of the present invention may have excellent optical properties. For example, the organic/inorganic composite film may have a haze value of less than 1.0 or preferably less than 0.7, transparency of greater than 85% or preferably greater than 90%, and luminosity of greater than 90 or preferably greater than 95 (CIE color space). In addition, the organic/inorganic composite film may have a b*color of less than 3 or preferably less than 1.5 (CIE color space).

Example 1

(a) 25 g of clay platelets (Laponite RDS, particle size of 20 nm×20 nm×1 nm) was dispersed in 970 g of deionic water to form 1000 g of 2.5 wt % of a clay platelets aqueous dispersion. Next, 300 g of an H-form cation ion-exchange resin (Dowex H form) and 300 g of OH from an anion ion-exchange resin (Dowex OH form) were added to the clay platelets aqueous dispersion to perform ion-exchange for forming an H-form clay platelets aqueous dispersion. Then, the H-form clay platelets aqueous dispersion was thoroughly mixed with 1440 g of isopropanol. A portion of the isopropanol and water were removed by vacuum decompression concentration and 2.5 wt % of an isopropanol dispersion was obtained. Then, 287.5 g of DMAc was added to the isopropanol dispersion. The remaining portion of water and isopropanol were removed by vacuum decompression concentration and 8 wt % of an H-form clay DMAc dispersion was obtained.

(b) 50 g of PVDF was dissolved in 450 g of DMAc to form 10 wt % of an PVDF-DMAc solution.

(c) 2.78 g of the H-form clay organic dispersion from step (a) and 20 g of the PVDF-DMAc solution from step (b) were mixed in an ultrasonic mixer for 2 hours and then placed overnight. Then, a film of the mixture was formed by blade coating. The film was dried at 60° C. for 15 mins and at 180° C. for 30 mins. 10 wt % of a PVDF/clay composite film was obtained.

Example 2

The same procedures as in Example 1 were repeated except that 2.78 g of the H-form clay organic dispersion was mixed with 6.25 g of the PVDF-DMAc solution and a 20 wt % of the PVDF/clay composite film was obtained.

Example 3

The same procedures as in Example 1 were repeated except that 2.78 g of the H-form clay organic dispersion was mixed with 1.39 g of the PVDF-DMAc solution and a 5 wt % of the PVDF/clay composite film was obtained.

Example 4

The same procedures as in Example 1 were repeated except that 2.78 g of the H-form clay organic dispersion was mixed with 0.773 g of the PVDF-DMAc solution and a 3 wt % of a PVDF/clay composite film was obtained.

Example 5

The same procedures as in Example 1 were repeated except that 2.78 g of the H-form clay organic dispersion was mixed with 29.17 g of the PVDF-DMAc solution and a 70 wt % of the PVDF/clay composite film was obtained.

FIG. 1 shows XRD spectrums of the PVDF/clay composite film in Example 1 and a pure PVDF film. As shown in FIG. 1, the PVDF/clay composite film in Example 1 has only a β crystalline phase, however, the pure PVDF film has both α and β crystalline phases.

Table 1 shows optical properties of the PVDF/clay composite film in Examples 1 and 2 and a pure PVDF film. As shown in Table 1, the PVDF/clay composite films in Examples 1 and 2 have better optical properties, such as brightness, transparency, and haze value, than that of the pure PVDF film. In addition, the color cast of each the PVDF/clay composite films in Examples 1 and 2 are lower than 3, which is at a level that cannot be observed by eyes.

TABLE 1

| | Luminosity (CIE color space) | b*color (CIE color space) | Transparency (%, at 550 nm) | Haze value (%) | Thickness (μm) |
|---|---|---|---|---|---|
| Pure PVDF | 85.12 | 2.38 | 72.43 | 23.32 | 30 |
| Example 1 | 95.70 | 0.41 | 92.19 | 0.2 | 26.4 |
| Example 2 | 96.47 | 0.31 | 93.13 | 0.55 | 25 |
| Example 3 | 91.59 | 0.54 | 91.59 | 0.14 | 28.2 |
| Example 4 | 95.90 | 0.39 | 93.88 | 0.37 | 27.5 |

Table 2 shows a comparison of UV aging characteristics of the PVDF/clay composite film in Example 2 and a pure PVDF film. The PVDF/clay composite film in Example 2 and the pure PVDF film were exposed to UV light at an intensity of 0.45 W/m$^2$ and wavelength of 340 nm for 500 to 4000 hours. As shown in Table 2, after exposure to the UV light, the PVDF/clay composite film in Example 2 had a better color cast and yellow index, which were much lower, than that of the pure PVDF.

TABLE 2

| | b*color (CIE color space) | Yellow index |
|---|---|---|
| Pure PVDF (before UV exposure) | 2.38 | 5.69 |
| Pure PVDF (after UV exposure for 500 hours) | 2.48 | 5.95 |
| Pure PVDF (after UV exposure for 1600 hours) | 2.55 | 6.09 |
| Pure PVDF (after UV exposure for 4000 hours) | 2.75 | 6.13 |
| Example 2 (before UV exposure) | 0.31 | 0.82 |
| Example 2 (after UV exposure for 500 hours) | 0.18 | 0.51 |
| Example 2 (after UV exposure for 1600 hours) | 0.25 | 0.67 |
| Example 2 (after UV exposure for 4000 hours) | 0.39 | 0.87 |

Figure 2:
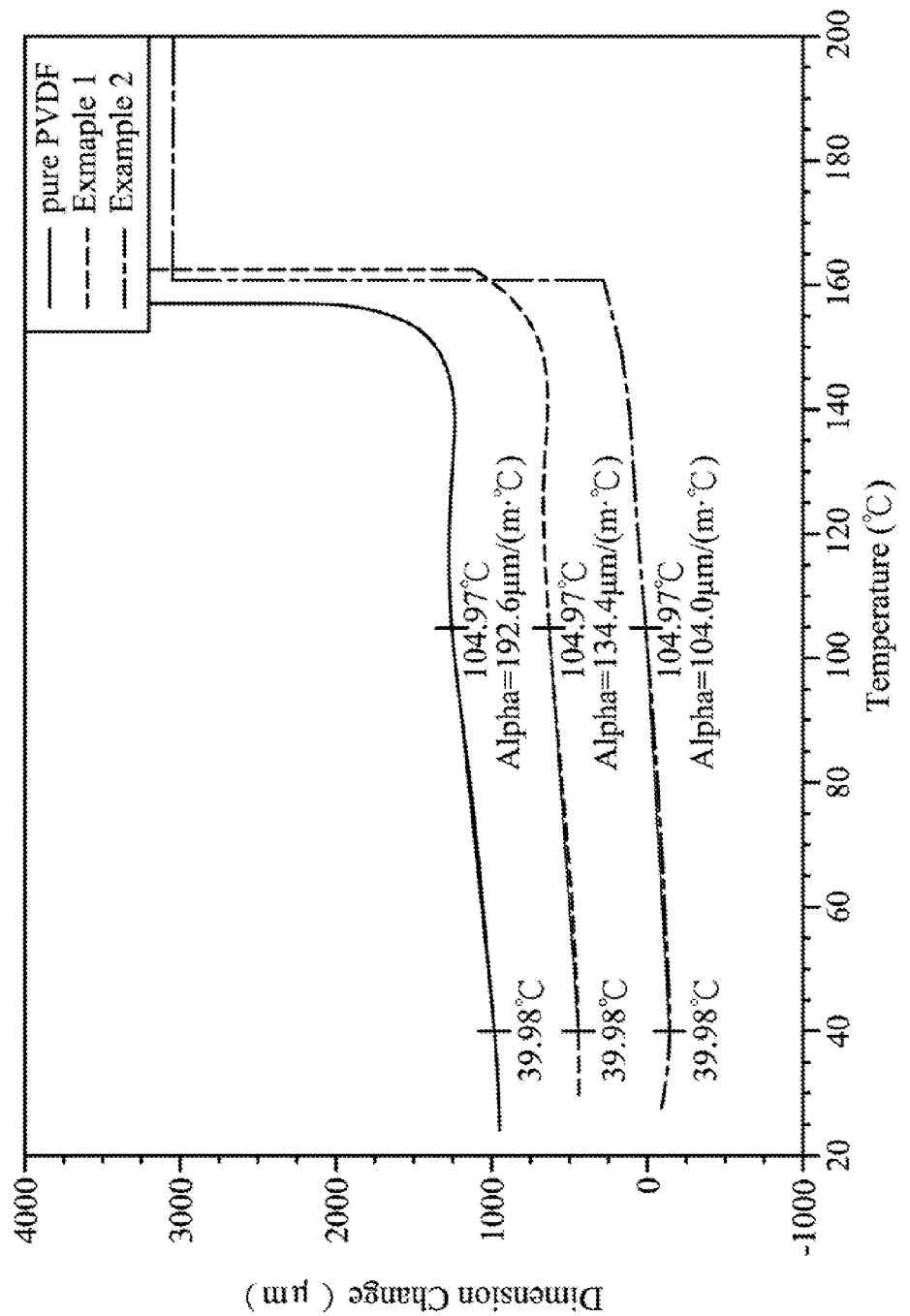
FIG. 2 shows thermal expansion coefficients of the PVDF/clay composite films in Examples 1 and 2 and a pure PVDF film.

FIG. 2 shows thermal expansion coefficients of the PVDF/clay composite films in Examples 1 and 2 and a pure PVDF film, under a temperature of between 40 and 105° C. The thermal expansion coefficients of the PVDF/clay composite films in Examples 1 and 2 and the pure PVDF film were 134.4 μm/(m*° C.), 104.97 μm/(m*° C.) and 192.6 μm/(m*° C.), respectively. From the results, it can be suggested that the PVDF/clay composite films have better thermal stability via incorporation of the clay, and performance is dependant on the content of the clay present in the composite film.

Figure 3:
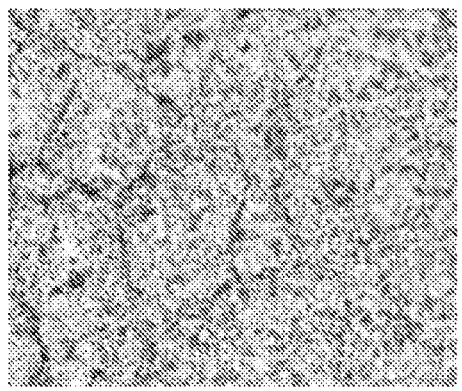
FIGS. 3-5 show TEM (transmission electron microscopy) images of the pure PVDF film and the PVDF/clay composite films in Examples 1 and 2, respectively.
Figure 4:
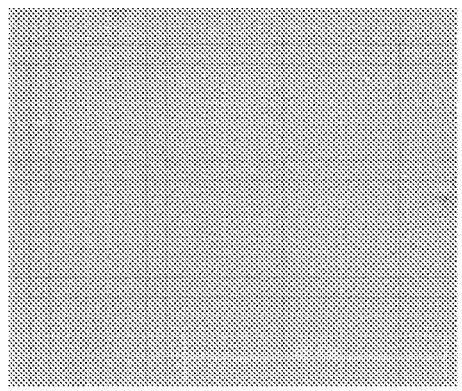
Figure 5:
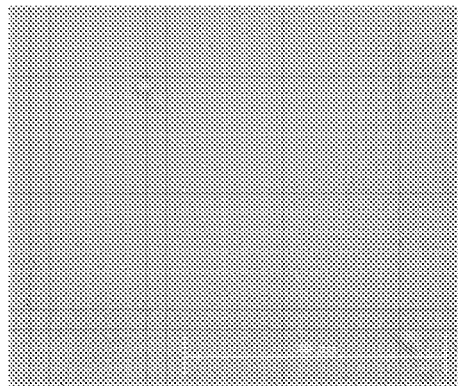
Figure 6:
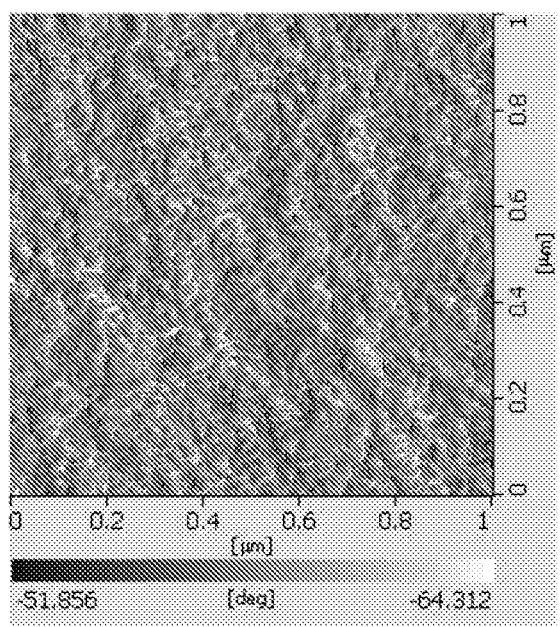
FIG. 6 shows an AFM (atomic force microscopy) image of the PVDF/clay composite film in Example 2.

FIGS. 3-5 show TEM (transmission electron microscopy) images of the pure PVDF film and the PVDF/clay composite films in Examples 1 and 2, respectively. FIGS. 3-5 show that the PVDF/clay composite films have smaller PVDF crystal sizes than that of the pure PVDF film. Thus, it can be suggested that the crystal size of the PVDF in the composite film is restricted by the clay. Furthermore, FIG. 6 shows an AFM (atomic force microscopy) image of the PVDF/clay composite film in Example 2, wherein the PVDF has a crystal size of smaller than 100 nm.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An organic/inorganic composite film, comprising:
poly(vinylidene fluoride) (PVDF) with inorganic nano-platelets dispersed therein, wherein a weight ratio of the PVDF and the inorganic nano-platelets is between about 97:3 and 20:80, and wherein the inorganic nano-platelets has a particle size of between about 20 and 80 nm, and
wherein the organic/inorganic composite film has a transparency greater than 85% at a wavelength between 380 and 780 nm, and the inorganic nano-platelets are H-form inorganic nano-platelets.

2. The organic/inorganic composite film as claimed in claim 1, wherein the H-form inorganic nano-platelets comprise an H-form of one selected from: (a) smectite clay, (b) vermiculite, (c) halloysite, (d) sericite, (e) mica, (f) synthetic mica, (g) layered double hydroxide, (h) synthetic smectite clay or (i) combinations thereof.

3. The organic/inorganic composite film as claimed in claim 1, wherein the organic/inorganic composite film has a haze value of less than 1.0.

4. The organic/inorganic composite film as claimed in claim 1, wherein the PVDF has a crystal size of smaller than 100 nm.

5. The organic/inorganic composite film as claimed in claim 1, wherein the organic/inorganic composite film has a thickness of between about 1 and 100 μm.

* * * * *